United States Patent

[11] 3,586,791

[72] Inventors Henry K. Puharich
Ossining;
Joseph L. Lawrence, New York, both of, N.Y.
[21] Appl. No. 887,676
[22] Filed Dec. 23, 1969
[45] Patented June 22, 1971
[73] Assignee Intelectron Corporation
New York, N.Y.
Continuation-in-part of application Ser. No. 446,267, Apr. 7, 1965, now abandoned.

[54] METHOD AND APPARATUS FOR HEARING BY BIODETECTION AND BIOTRANSDUCTION OF RADIOFREQUENCY ENERGY
7 Claims, 3 Drawing Figs.

[52] U.S. Cl. ................................................. 179/107, 128/1
[51] Int. Cl. ......................................... H04r 25/00
[50] Field of Search ........................................ 179/107; 128/1

[56] References Cited
UNITED STATES PATENTS
3,393,279  7/1968  Flanagan ........................ 179/107
3,170,993  2/1965  Puharich et al. ................ 179/107

*Primary Examiner*—Kathleen H. Claffy
*Assistant Examiner*—Thomas L. Kundert
*Attorney*—Mandeville and Schweitzer ABSTRACT: The present invention relates to a method and apparatus utilizing R-F carriers of predetermined frequencies to stimulate the sensation of hearing in human subjects and, more particularly, to a method and apparatus for establishing a peak LC series resonant coupling, at approximately the predetermined R-F carrier frequency, between a signal source and the facial nerve system of the human subject to transmit A-F information modulated onto the R-F carrier to the brain through the "facial nerve system," well-defined anatomical network of nerves. More particularly, the modulated R-F signal is capacitively coupled to opposite sides of the head at the periaural and/or stylomastoid region through electrodes. A series inductor is included between the source of R-F signals and each of said electrodes and the inductance of said series inductors is related to the capacitance of the coupling electrodes and the capacitance of the head of the subject so as to tune the R-F signals in peak LC series resonance substantially at the selected carrier wave frequency regardless of changes in the physiology of the subject, said means being a necessary condition for auditory information transfer to the deaf.

METHOD AND APPARATUS FOR HEARING BY BIODETECTION AND BIOTRANSDUCTION OF RADIOFREQUENCY ENERGY

CROSS REFERENCES TO RELATED APPLICATIONS

This application is a continuation-in-part of application Ser. No. 446,267, filed Apr. 7, 1965 and now abandoned. This application is also related to copending application Ser. No. 682,152, filed Nov. 13, 1967 and now U.S. Pat. No. 3,497,637, and is also related to copending application Ser. No. 633,035, filed Apr. 24, 1967. The pertinent subject matter of the aforementioned copending applications is hereby incorporated by reference.

BACKGROUND OF THE INVENTION

The present invention relates to the electrical stimulation of hearing in human subjects, and is directed more specifically to establishing and controlling electrical circuit parameters in order to achieve efficient and accurate "hearing" stimulation of the "facial nerve system." The present invention represents an improvement on our prior inventions described and claimed in U.S. Pat. No. 2,995,633, granted Aug. 8, 1961, U.S. Pat. No. 3,267,931, granted Feb. 23, 1965, and U.S. Pat. No. 3,267,931, granted Aug. 23, 1966, and reference may be made to these patents for a fuller understanding of principles underlying the present invention.

In accordance with our previous inventions, a human subject may be stimulated to "hear" normally audible sounds by converting those sounds to correspondingly modulated electrical signals and impressing the signals upon the subject through his "facial nerve system." The modulated signals are transmitted to hearing centers of the brain, where they produce sensations of hearing. The principles of the invention are applicable in a way which enables the essentially mechanical aspects of the conventional hearing processes of the ear to be bypassed, enabling hearing stimulation to be achieved in subjects whose normal "ear system" auditory facilities have been impaired by utilizing the "facial nerve system" as the conduit of encoded "sound" information (R-F signals amplitude modulated with audio information) to the brain.

In accordance with one of our previous discoveries, electrical stimulation of the "facial nerve" hearing system may be significantly enhanced by supplying the signal in the form of an amplitude-modulated carrier signal, i.e., a transdermal TD signal, which apparently is processed and demodulated in some way by the mechanisms of the body. Even further gains in efficiency may be realized in many instances by establishing a feedback coupling between the body and the signal generator, open essentially to the carrier signal.

SUMMARY OF THE PRESENT INVENTION

In accordance with the principles of the invention, novel and improved circuit arrangements are provided so that the coupling between the output of a TD signal transmitting system and the human subject is in series resonance at approximately the carrier signal frequency. In this respect, in accordance with certain of our prior inventions, the principal coupling between the subject and the electrical system is established by means of capacitive coupling elements, which may typically be in the form of dermal electrodes or dental caps, for example. The present invention, as a specific critical aspect, provides for the incorporation of series inductances in conjunction with the capacitive coupling elements. These series inductances are either variable or so selected in the first instance as to bring the "circuit load" (including the subject, the capacitive couplings and the series inductances) into LC series resonance substantially at the chosen carrier signal frequency.

In one system according to the invention, the high frequency carrier signal is supplied from a controllable external signal source and is substantially fixed during operation of the system. However, in some instances, the capacitive coupling of the TD signal source to the subject may be of a nature which varies according to such things as the momentary physiological characteristics of the subject. Accordingly, the invention includes novel and improved circuit arrangements in which the carrier frequency is generated within the body of the subject and at least partly as a function of the capacitive coupling of the circuit to the subject. In accordance with this arrangement, the carrier frequency may vary during operation of the circuit, but it will at all times be generated substantially at the instantaneous LC series resonant frequency of the system.

Through experimentation and research, it has been determined that effective, electrical stimulation of hearing, utilizing amplitude modulated R-F stimulation signals (TD signals), requires the establishment of an LC series resonant coupling at approximately the R-F carrier frequency between the source of stimulating signals and the facial nerve system of the human subject being stimulated. Moreover, it has been determined that all tissues that are electrically stimulated have different "characteristic frequencies" (for resonance) which vary from human subject to subject and which vary within a single human subject from electrode site to electrode site. The invention herein is based upon the premise that the viable tissues, in the subjects being stimulated with modulated R-F energy, behave as dielectric materials in LC circuits and, that in order to establish the desired series resonant coupling at R-F carrier frequency, a series inductance must be matched to the capacitance of the tissue at the site at which the coupling electrodes are to be placed. However, since the "characteristic frequency" and the capacitance of tissues is not a fixed value, being variable due to physiological changes in a given subject, and, in any event, being nonuniform from site-to-site in a given subject, and being nonuniform from subject-to-subject, it is necessary to make some suitable arrangement in order to maintain the aforementioned, desired LC series resonant coupling.

It is to this concept that the present invention is directed, i.e., the concept of the maintenance of a series LC resonant coupling at carrier frequency between the signal source and the human subject by the appropriate selection of a series inductance. It is this basic concept which enables the apparatus of the present invention to be used to stimulate hearing in the totally deaf.

Moreover, it is not the energy transfer characteristics of the LC series resonant circuit that are relied upon to achieve effective hearing stimulation; it is rather the phase relationship of the current and voltage of the applied signals that is critical. In other words, the "brute force" application of high-power TD signals will not be effective in achieving TD hearing unless the current and voltage vectors of the applied signals are substantially completely in phase with one another. Accordingly, the desired maintenance of LC series resonance is for achieving proper phase relationships between the current and voltage vectors for the purpose of effective auditory information transfer to the deaf human.

More specifically, the present invention is directed to the establishment of the desired LC series resonant coupling at carrier frequency by the use of appropriately selected series inductors. That is to say, the apparatus of the invention provides for OF THE DRAWINGS the specifically "tuned" LC series resonant coupling by the use of inductors which have sufficient inductance when placed in series with the "varying" capacitance of the facial nerve site (variation owing to physiological change or differences in site selection or differences from subject-to-subject) to provide LC series resonant coupling at the carrier frequency regardless of said "-variations."

DESCRIPTION OF THE DRAWINGS

For a more complete understanding of the present invention and a fuller appreciation of its attendant advantages, reference should be made to the following detailed description taken in conjunction with the accompanying drawings, in which.

DESCRIPTION OF THE INVENTION

Figure 1:
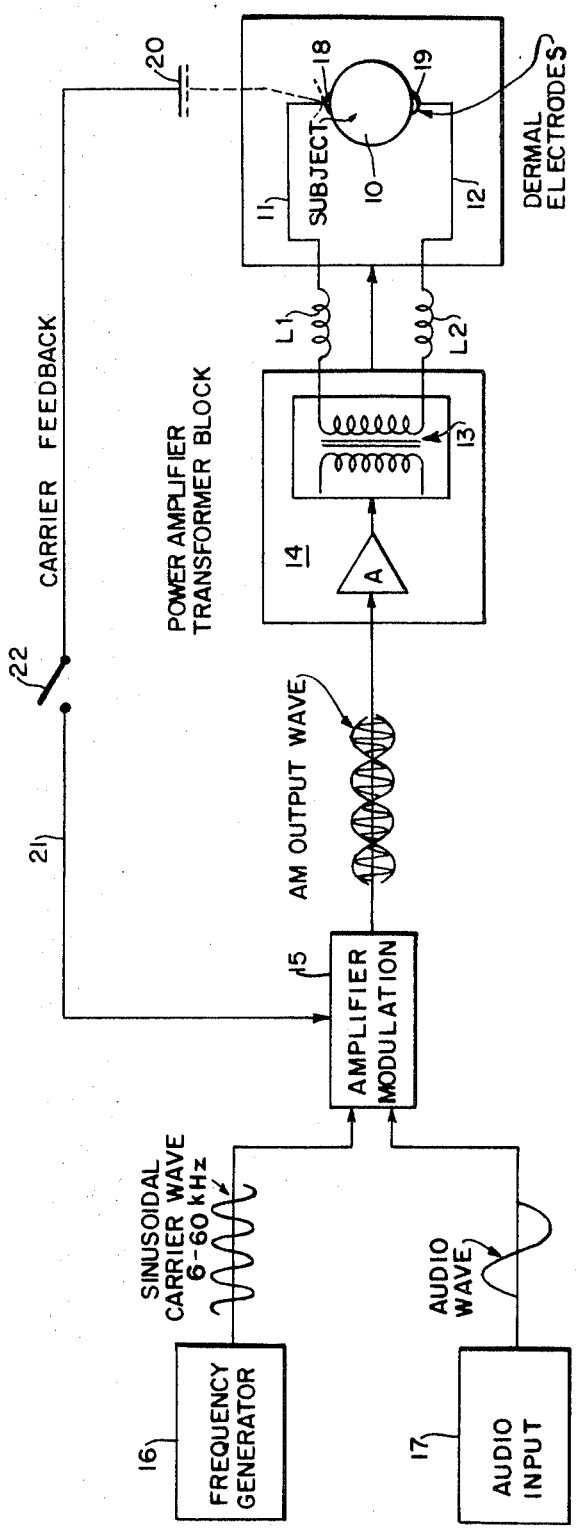
FIG. 1 is a simplified schematic representation of an electrical hearing stimulation system according to the invention, utilizing an external source of carrier signal.

Referring initially to FIG. 1, the reference numeral 10 designates a human subject coupled through output conductors 11, 12 and an isolating transformer 13 with an electronic power amplifier generally designated by the numeral 14. The amplifier 14 is supplied from a preamplifier 15 which receives and combines signals from a carrier signal generator 16 and an audiofrequency signal generator 17. The audiofrequency generator may comprise a microphone, tape recorder, radio receiver, etc., and the carrier signal generator 16 may be a conventional frequency generator capable of supplying a sinusoidal carrier wave in the range of, say, 6 to 60 kHz. (1,000 cycles per second). The output of the preamplifier 15 and of the amplifier 14 is the carrier wave, amplitude modulated by the audiofrequency signal, and this is impressed upon the subject through the conductors 11, 12. As set forth in our prior patents, the modulated electrical output is transmitted to the "facial nerve system" of the subject, which consists of a recognized, identifiable groups of nerves located in the head and neck region of the subject. The conductors are coupled with the facial nerve system by means of capacitive coupling elements 18, 19 which may be dermal electrode elements covered with a dielectric insulator and placed properly against the skin of the subject.

According to discoveries of our invention, the carrier frequency should be within the range of approximately 6—60 kHz. the specific value depending significantly upon the specific configurations of the electrodes employed.

With increasing carrier signal frequencies, the system utilizes increasing amounts of power, at least up to carrier frequencies of about 200 kHz. Most advantageously, for a system adapted to stimulate a hard of hearing (but not completely deaf) subject to hear speech and music with adequate quality, the carrier signal frequency may be on the order of 50 kHz. For totally deaf subjects, the carrier signal is in the narrow range of 18—37 kHz. and other factors, including time of stimulation must be considered, as will be discussed in greater detail hereinafter.

In accordance with the invention, the coupling of the TD signal generating circuitry of the subject should be in series resonance at approximately the frequency of the carrier signal. In each instance, the capacitance of the couplings made by electrode elements 18, 19 with the subject, and the capacitance introduced by the subject himself, may be significantly variable from subject to subject and may, in any event, be such as to establish the series resonant frequency of the coupling circuit well above the desired level of the carrier frequency. Accordingly, as a specific aspect of the invention, the coupling circuit includes series inductance coils $L_1$, $L_2$, which may be variable in order to enable the series resonance of the coupling circuit to be precisely tuned to the carrier frequency, of it may simply be appropriately selected to achieve the series resonance at the carrier signal frequency for the particular subject. In either instance, the series resonance of the coupling circuit to the carrier signal frequency ensures that the current and voltage vectors of the TD signal are in phase. Moreover, it greatly increases the efficiency of the system and enables it to be adapted readily to different subjects and to different modes of capacitive coupling to the subject (e.g., through dermal bare or insulated electrodes, dental caps, etc.).

Theoretically, it would be possible to provide the coupling circuit initially with inductance of a predetermined, fixed value, with arrangements being made to control and vary the capacitance of the coupling to the subject in order to achieve the desired series resonance. However, as a practical matter, the capacitance of the coupling to the subject is variable from person to person and may be difficult to control. In the case of coupling through dental caps, for example, the capacitance may not even be determinable until the coupling has been completed. Accordingly, the invention provides for tuning to the desired series resonance through the subsequent determination or adjustment of a desired level of inductance.

The system of FIG. 1, as so far described, may optionally further include a feedback coupling between the subject and the input of the preamplifier 15, substantially in accordance with the teachings of our prior U.S. Pat. No. 3,267,931. This coupling may be effected by a capacitor plate 20 positioned in proximity to the body of the subject, to have an air capacitance coupling therewith. The plate 20 is connected through a conductor 21, which may include a control switch 22 to the input of the preamplifier 15. Our previous discoveries have established that the subject will tend to reradiate energy at the carrier frequency which when fed back to the input end of the system brings about an advantageous improvement in the response of the subject to energization.

In the system of FIG. 1, it is advantageous to provide for substantially fixed capacitance in the coupling to the subject, in order to keep the coupling system tuned properly to the desired series resonant frequency. This may be difficult in some instances, however, because physiological or psychophysiological changes in the subject may bring about unintentioned uncontrollable changes in capacitance. Thus, in some cases, the circuit of FIG. 2 may be used to advantage, because it includes provisions for generating a carrier frequency which can vary as a function of the capacitance of the coupling with the subject.

Figure 2:
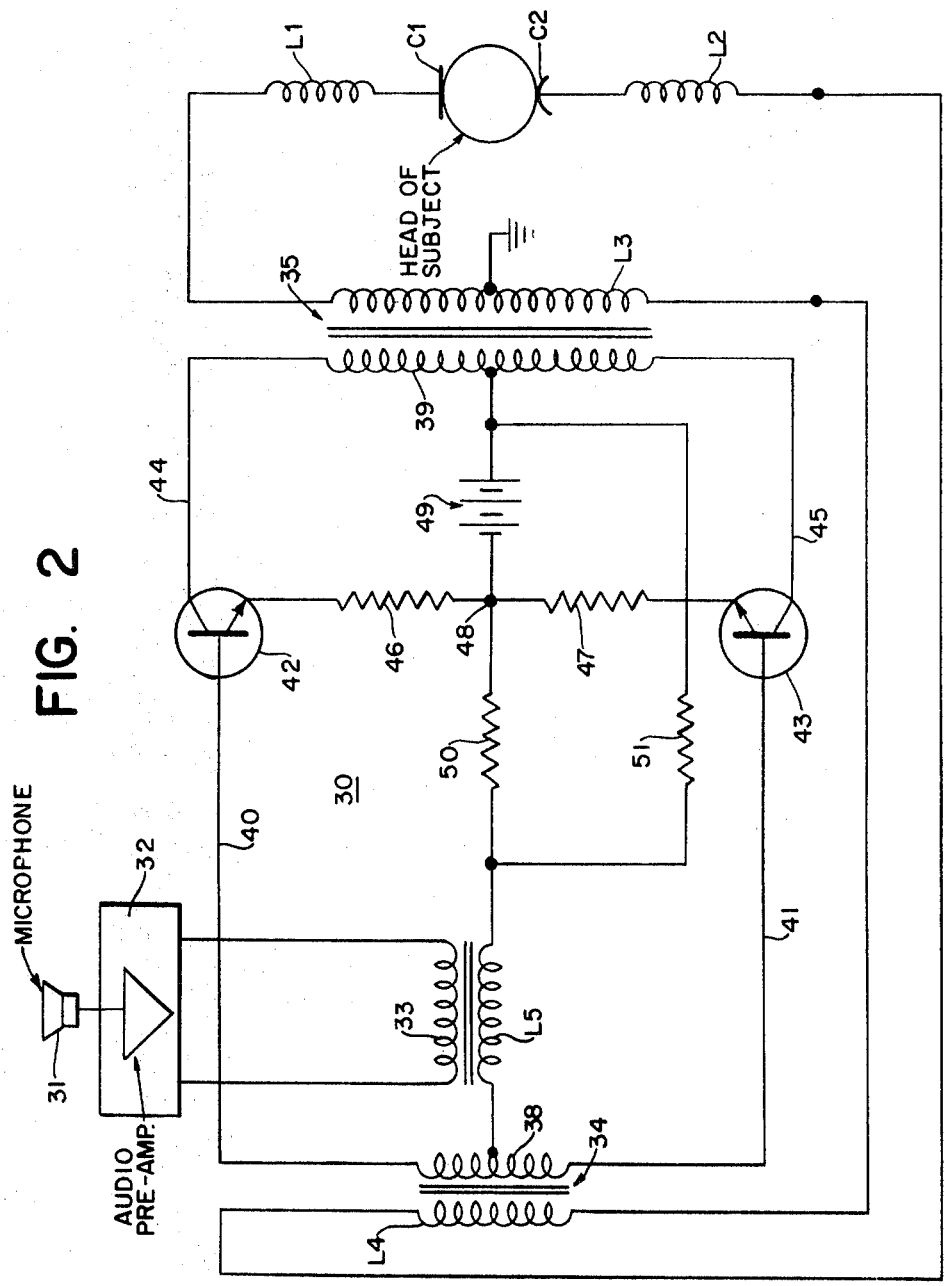
FIG. 2 is a simplified schematic representation of an electrical hearing stimulation system according to the invention, utilizing a self-generated carrier signal.

The system of FIG. 2 includes an amplifier circuit arrangement generally designated by the numeral 30 which includes an oscillator designed to oscillate over a relatively broad range of carrier signal frequencies, according to stimulations received from the subject. The input to the amplifier 30 consists of a suitable input element, such as a microphone 31, which is connected to a preamplifier 32. The preamplifier is in turn coupled with the amplifier through a coupling transformer 33 having predetermined inductance characteristics. An MT26–FV transformer has been used with success. The secondary coil of the transformer 33 is designated as inductance $L_5$.

The output of the amplifier circuit consists of the secondary coils of coupling transformers 34, 35, the secondary coils of which are designated as inductors $L_3$, $L_4$. The inductance coils $L_3$ and $L_4$ are connected in series, with one side of the coil $L_3$ being connected through an inductance coil $L_1$ and capacitive coupling $C_1$ to the subject, while the inductance coil $L_4$ is connected through and inductance $L_2$ and the capacitive coupling $C_2$ to the subject. Coil $L_3$ is center tapped to ground, as shown. Typically, the secondary coil $L_4$ of the transformer 34 may consist of 30 turns and the center-tapped primary coil 38 of the transformer may likewise consist of 30 turns. The core may be Ferroxocube 1408. The secondary coil $L_3$ of the transformer 35 may be 90 turns, while the center-tapped primary coil 39 may have 40 turns. The center tap of the primary coil 38 is connected directly to the secondary coil $L_5$, while the end terminals of the primary coil are connected through conductors 40, 41 to the base electrodes of transistors 42, 43, which typically may be of type 2N1482. The collector electrodes of the transistors are connected through conductors 44, 45 to the outer terminals of the center-tapped primary coil 39, while the emitter electrodes are connected through resistors 46, 47 to a terminal point 48. The resistors 46, 47 typically may be of about 2.7 ohms resistance.

A battery 49, which may be of about 22 volts potential has its negative side connected to the terminal point 48 and its positive terminal connected to the center tap of the transformer coil 39. The negative side of the battery is also connected through the terminal point 48 and a resistor 50 of about 15 ohms to the secondary coil $L_5$ of the input coupling transformer. A shunt resistor 51 of about 3000 ohms is conncted in bypassing relation to the resistor 50 and battery 49, as indicated.

With the circuit arrangement of FIG. 2, an audio signal input through the transformer 33 is amplified and impressed upon the subject. In accordance with discoveries reflected in the teachings of our copending application Ser. No. 802,788, filed Feb. 27, 1969, the energy thus supplied to the subject energizes the subject in a manner to cause the subject to radiate high frequency energy over a fairly broad spectrum of frequencies. The mechanism for this is not clearly understood, but it has been observed and measured, as set forth in the last-mentioned copending application. This radiated high frequency energy is selectively passed through the output coupling circuit of the system, in accordance with the series resonant frequency established by the inductances $L_1$–$L_4$ and the capacitive coupling elements $C_1$, $C_2$. The series resonant frequencies passed by the output coupling circuit are impressed into the oscillating circuitry of the amplifier, amplified, and become a component of the information-bearing energy applied to the subject, by in phase or substantially in phase current and voltage vectors of the TD signal so that the desired sensations of hearing are achieved in substantially the same manner as explained in connection with the system of FIG. 1.

In the system of FIG. 2, variations in the physiological condition of the subject or otherwise, which could cause variations in the total capacitance of the output coupling circuit, would simultaneously vary the series resonant frequency "accepted" from the subject, so that the amplified carrier frequency would at all times be substantially the series resonant frequency of the output coupling circuit, enabling the system to operate at maximum effectiveness at all times. The initial parameters are so selected, of course, that the nominal or desired series resonant frequency level will approximate a predetermined value between approximately 6—60 kHz.

Figure 3:
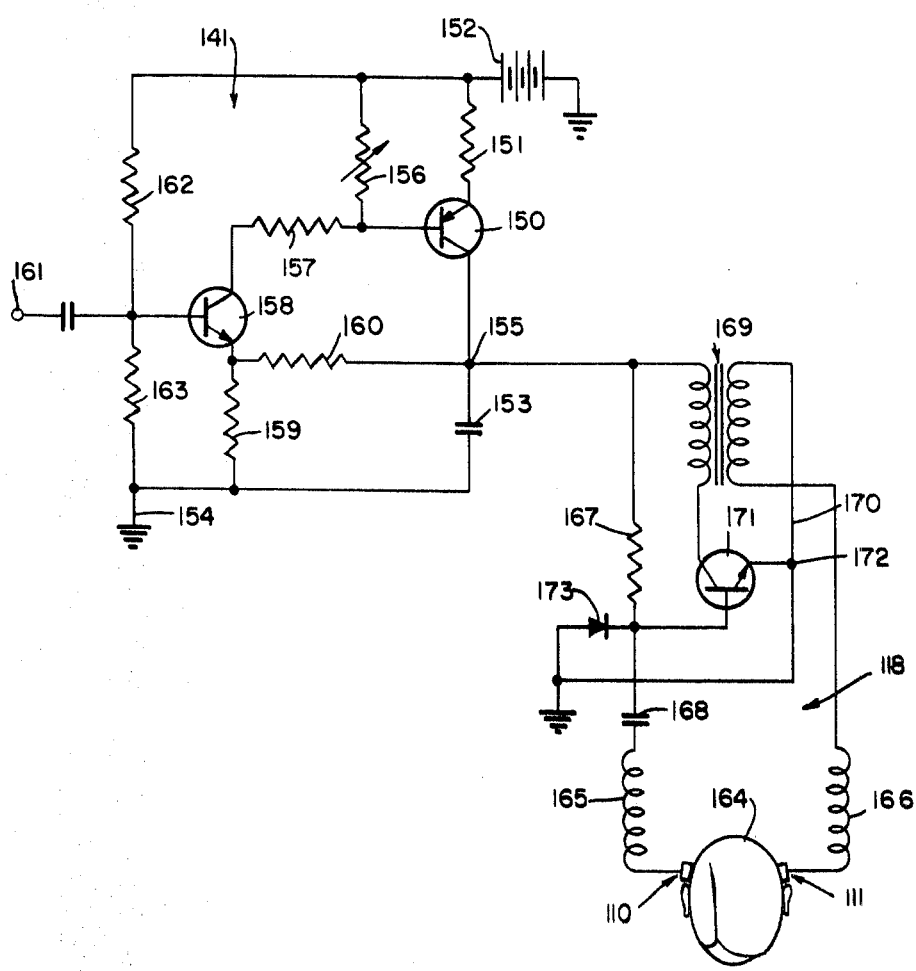
FIG. 3 is a schematic circuit diagram showing a transdermal signal generator having automatic resonant frequency control and embodying the principles of the present invention.

Referring now to FIG. 3, there is shown schematically a typical amplifier-oscillator circuit arrangement for advantageous incorporation in the system of the invention. In particular, the output circuit oscillator system is especially advantageous in that it provides for the generation of a carrier signal which is at all times in or substantially in resonance with the output circuit, which includes the subject. Moreover, the oscillator circuit is effectively able to maintain resonance conditions as the parameters of the output circuit change with physiological changes in the body of the subject, variations in electrode contact pressures, etc.

The amplifier section 141 shown in FIG. 3 is a simple, two-stage amplifier, the output section of which includes a transistor 150, suitably a 2N1184B, the emitter side of which is connected through a 680-ohm resistor 151 to the positive terminal of an 18-volt power supply 152. The collector element of the transistor is connected through a 0.01-microfarad condenser 153, to ground at 154, and the signal output tap for the amplifier is also connected to the collector electrode at 155. The base electrode of the transistor 150 is connected through a 1,000-ohm variable resistor 156 to the positive side of the power supply and through a 1,000-ohm resistor 157 to the collector element of a transistor 158, suitably a 2N1481. The emitter side of the input stage transistor 158 is connected through a 1,000-ohm resistor 159 to ground and through a 35,000-ohm resistor 160 to the collector of the output stage transistor 150. The base element of the transistor 158 is connected to the input at 161. It is also connected through a 100,000-ohm resistor 162 to the positive terminal of the power source and through a 3,300-ohm resistor 163 to ground.

The output signal of the amplifier stage 141 is applied to an oscillator circuit 118 which includes a pair of electrodes 110, 111 and the head of the subject 164. In accordance with the present invention, the output circuit, including the subject, is specially designed to constitute an L-C oscillator circuit having a resonant frequency in a desired frequency range, most advantageously approximately 6—60 kHz. Of particular significance, the oscillator circuit is designed to accommodate the fact that a significant circuit component is the capacitance of the coupling between the electrodes 110, 111 and the body of the subject. This can vary widely as a function of frequency, and of the interface conditions between the electrodes and the subject (e.g., assume that the subject begins to perspire), and is also known to vary with physiological changes in the subject having to do with his emotional condition. In this respect, experience has shown that capacitance across the head of a subject may vary as widely as from about 0.002 to about 1 microfarad.

Since the circuit coupling to the subject is essentially capacitive, and since the capacitance values of such coupling may vary significantly because of physiological factors which are transient in nature, the circuit has incorporated therein relatively large inductances, such that the inductances are principally influential in determining the resonant frequency of the oscillator system. Pursuant to this arrangement, significant variations in the capacitance at the subject will have a relatively suppressed effect upon the resonant frequency of the circuit as a whole, such that the oscillator can readily accommodate these changes in circuit parameters.

The design parameters of the oscillator circuit are such as to oscillate at the desired carrier signal frequency. Accordingly, the output of the amplifier stage 141 may be a low frequency signal, which is combined in the oscillator stage with the higher frequency carrier. The thus modulated carrier (TD signal) is applied to the subject 164 in a manner which assures the resonance conditions which are desired.

For a circuit as thus far described, the oscillator circuits 118 may be provided with added inductance, usually in the form of coils 165, 166 on opposite sides of the subjects, which typically have the following inductance values for the following circuit conditions: The oscillator 118, connected for use in conjunction with a pair of bare metal electrodes, most advantageously has a pair of series inductances of 70 millihenries each, which experience indicates provides for a carrier frequency oscillation in the range of 6 kHz. to 10 kHz. (It may also be desirable to provide a still further oscillator, not specifically shown, having a pair of series inductance elements of 2 millihenries each, for use in connection with a pair of bare electrodes, to provide for a carrier frequency oscillation in the range of about 10 to 20 kHz.) The oscillator 118, intended for use in connection with the insulated electrodes advantageously includes a pair of inductance elements of 30 millihenries each, which experience indicated typically results in a carrier frequency oscillation of 40 to 60 kHz. The oscillator intended for use with dissimilar pairs of electrodes, advantageously has a pair of inductance elements of 50 millihenries each, which experience indicates will provide a carrier frequency oscillation of from about 20 to 40 kHz.

In the overall oscillator circuit, the amplifier output is connected through a 180,000-ohm resistor 167, a 0.01 microfarad condenser 168, and one of the large inductances 165 to one side of the head of the subject. The other side of the subject's head is connected through the inductance coil 166, one side of a transformer 169, which suitably may be an NH1702GA, and thence through conductor 170 to ground. The other coil of the transformer 169 is connected to the collector element of a transistor 171, which suitably may be a 2N3053. The emitter element of the transistor is connected to ground at 172, and the base element is connected between the resistor 167 and the capacitor 168 and through a diode 173 to ground.

When activated by signals from the amplifier stage 141, the oscillator circuits will oscillate at a desired carrier frequency signal, as a function of the L-C parameters (principally)

thereof. Since the resonant circuit includes the subject itself, the carrier signal typically can be applied under peak resonance conditions, extraordinary changes in the circuit parameters being suppressed through the utilization of relatively large inductance elements, as described.

APPLICATION OF THE INVENTION TO THE TOTALLY DEAF

In cases of total deafness, even where there is strong evidence that the nerves of the cochlea have been totally destroyed by an infectious process, hearing may be achieved by the practice of the invention. To that end, an amplitude-modulated low R-F signal may be coupled to the skin of the patient below the mastoid process (bilaterally) via circular, bare metal plate electrodes. The head, of course, is the dielectric between the two plates in the required series LC resonant circuit. Hearing is possible in the totally deaf when all of the following specific conditions are met:

1. the patient initially has received several weeks of TD therapy in accordance with principles of our copending application Ser. No. 633,035;
2. the R-F carrier is automatically tuned at peak LC series resonance, with R-F carrier between 18—37 kHz., and the series inductors are 2 millihenries;
3. small (e.g., 0.8-inch-diameter) bare plate electrodes are bilaterally placed on stylomastoid area of the skin;
4. the TD generator has a balanced signal output; and
5. a DC polarization of energized tissue cells is achieved as a function of time, usually 10—20 minutes after energization has commenced.

The basic condition for hearing in "normals" is that the dorsal cochlear nucleus (DCN) in the brain stem be intact, and that the neural circuits from the DCN to the temporal cortex are intact. In the "normal" hearing person the cochlea transduces and encodes sound which is delivered to the DCN as a temporal digital code. Therefore, for a totally deaf person to hear speech sounds linearly, the TD signal must deliver to the DCN the same coded information that a normal cochlea would deliver. It is believed and currently hypothesized that the applied TD signal, as described above, does indeed synthesize electronically the natural cochlear encoded electrical signal or a close equivalent.

It should be understood that the critical importance in the employment of peak LC series resonantly tuned signals is to obtain the voltage and current vectors which are in phase, which in phase vectors are believed to provide the subject with the requisite synthesized audio information to provide A "sensation of hearing." While peak resonance is the desired optimum, a very small degree of detuning from resonance is permissible without destroying the sensation of hearing. In the totally deaf a deviation of not more than 1 percent from the LC series resonant frequency may be tolerated in some instances, while in "normals" or nontotally deaf, a somewhat greater deviation of approximately 3—4 percent may be tolerated. Thus, the expression "LC series resonance" as utilized herein should be interpreted as being inclusive of these very small tolerances.

The time factor recited as being of critical importance in obtaining hearing in the totally deaf is due to the barrier potential, which in totally deaf subjects is approximately 0.6 volt and requires anywhere from 5—26 minutes (usually 10—20 minutes) to be achieved with the continuous and uninterrupted application of the TD signal through bare electrodes to the head.

From our work to date, it has been determined that the totally deaf can achieve a quality sensation of hearing only when the TD signals are applied in peak LC series resonance at the carrier frequency and when the signal is applied bilaterally to the stylomastoid areas through bare electrodes. When these and the other collateral conditions (time factor; balanced output from TD signal generator; etc.) are met, a subject experiences "hearing" in the center of his head. Were dielectric covered electrodes to be used, the totally deaf subject would be unable to hear and if the TD signals were applied in other than peak LC series resonance the totally deaf subject would be unable to hear. Interestingly, if one bare electrode and one dielectric covered electrode are used to couple the TD signal to a totally deaf subject, the subject will tend to have lateralized hearing and substantially more power will be required to achieve that hearing as compared to the use of a pair of bare electrodes. However and in any event, it has been determined that the power of the signal applied to a totally deaf subject must be limited to band levels of 40—60 milliwatts. When the power of the signal exceeds 60 milliwatts, the quality of the "sensation of hearing" quickly and seriously degrades. Moreover, when the power falls below 40 milliwatts, no "hearing" whatever is possible.

From the foregoing disclosure, it will be appreciated that the achievement of hearing through the application of TD signals to a subject in peak LC series resonance at the carrier frequency is due to a biological phenomenon rather than high-energy transfer phenomenon. The discovery and utilization of this phenomenon may and should, of course, be employed to advantage in the practice of the inventions disclosed in our previously issued patents.

It should be understood that the specific forms of the invention herein illustrated and described are intended to be representative only, as certain changes may be made therein without departing from the clear teachings of the disclosure. Accordingly, reference should be made to the following appended claims in determining the full scope of the invention.

We claim:
1. In an apparatus for electrically stimulating hearing in human subjects, the combination of
   a. a signal source for supplying carrier wave signals at a frequency above the normal audible range of the subject,
   b. a second signal source for supplying audiofrequency signals,
   c. means modulating said carrier wave signals with said audiofrequency signals and having an output comprising a modulated Lc series source, and
   d. a tuning and coupling circuit adapted to connect the subject to said modulated signal source in tuned LC series resonance,
   e. said tuning and coupling circuit including a pair of capacitive coupling means,
   f. said tuning and coupling circuit further including a pair of inductance means each of which is connected in series with each coupling means,
   g. the inductance of said inductance means being related to the capacitance of said coupling means and the capacitance of said subject so as to tune said modulated signals in peak series resonance substantially at said carrier wave frequency regardless of changes in the physiology of the subject.
2. The apparatus of claim 1, in which
   a. the source of carrier wave signals comprises an external signal generator circuit.
3. The apparatus of claim 1, in which
   a. the source of carrier wave signals comprises an amplifier circuit having its input and output coupled with said coupling circuit and actuated to supply amplified carrier wave signals thereto in accordance with high frequency signals imparted to the coupling circuit by the subject.
4. The apparatus of claim 1, in which
   a. said carrier wave is supplied at a frequency in the range of 18 to 37 kHz.,
   b. said capacitive coupling means comprises a pair of bare electrodes.
5. In the method of electrically stimulating human subjects to produce sensations of hearing, the improvement which comprises
   a. supplying an audio-modulated carrier wave in a predetermined frequency range, b. applying said wave to the subject and tuning the applied wave to LC series resonance at carrier wave frequency through a pair of capacitive couplers and a separate pair of series inductor means, c. the inductance of said pair of series inductor means being related to the capacitance of the coupling established by said capacitive couplers and to the capacitance of the tissue of the subject to achieve said series resonance substantially at the carrier wave frequency.

6. The method of claim 5, in which
   a. at least one of said capacitive couplers is a bare electrode.

7. The method of claim 5, in which
   a. said capacitive couplers comprise a pair of bare electrodes placed bilaterally at stylomastoid regions of the head,
   b. said carrier wave is in the range of 18—37 kHz., and
   c. the power of said applied modulated carrier wave does not exceed 40—60 milliwatts.